(12) United States Patent
Griffin

(10) Patent No.: US 6,447,071 B1
(45) Date of Patent: Sep. 10, 2002

(54) FULL FACE WHEEL WITH SLIP FIT JOINT BETWEEN DISC AND RIM

(75) Inventor: Patrick M. Griffin, Canton, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/732,133

(22) Filed: Dec. 7, 2000

(51) Int. Cl.$^7$ ................................................. B60B 3/10
(52) U.S. Cl. ........................... 301/63.104; 301/63.106; 29/894.322
(58) Field of Search .................. 301/63.101, 63.103, 301/63.104, 63.106; 29/894.322

(56) References Cited

U.S. PATENT DOCUMENTS

| | | | |
|---|---|---|---|
| 3,612,614 A | 10/1971 | Ware | |
| 3,874,736 A | 4/1975 | Anderson et al. | |
| 5,027,508 A | 7/1991 | Cissel, II | |
| 5,257,455 A | * 11/1993 | Iwatsuki | 301/63.107 |
| 5,360,261 A | 11/1994 | Archibald et al. | |
| 5,647,126 A | 7/1997 | Wei | |
| 5,651,590 A | 7/1997 | Word | |
| 5,803,553 A | 9/1998 | Wei | |
| 5,988,763 A | * 11/1999 | Wei | 301/63.103 |
| 5,997,102 A | * 12/1999 | Stanavich | 301/63.103 |

\* cited by examiner

Primary Examiner—Russell D. Stormer
(74) Attorney, Agent, or Firm—MacMillan, Sobanski & Todd, LLC

(57) ABSTRACT

The present invention relates to a full face wheel comprising a full face wheel disc and a partial wheel rim. The wheel disc includes an inboard portion having an annular groove formed therein. The wheel rim includes an annular tapered outboard end. The tapered outboard end of the wheel rim is received in the groove in a slip fit. A bond such as a weld is formed between the outboard end of the wheel rim and the inboard portion of the wheel disc to secure the wheel rim to the wheel disc.

13 Claims, 4 Drawing Sheets

FULL FACE WHEEL WITH SLIP FIT JOINT BETWEEN DISC AND RIM

BACKGROUND OF THE INVENTION

This invention relates in general to full face vehicle wheels, and in particular to a full face wheel having a slip fit joint between the full face wheel disc and the partial wheel rim.

It is known in the art to fabricate a two piece vehicle wheel by attaching a wheel disc to a separately formed wheel rim. Typically, the wheel disc is cast or forged from metal. The wheel rim is typically formed from a flat strip of metal which is rolled into a cylindrical hoop. The adjacent edges of the hoop are butt welded together to form a cylindrical preform. The preform is formed into a wheel rim by a metal forming process such as a spin forming process. The metal forming process forms inboard and outboard tire bead retaining flanges, inboard and outboard tire bead seats and a center deepwell into the preform. The resulting wheel rim is usually attached to the wheel disc by a welding process. Both the wheel disc and the wheel rim can be formed from alloys of the same lightweight metal, such as aluminum, magnesium or titanium, or, as a further cost reduction, a wheel disc formed from an alloy of a lightweight metal can be attached to a wheel rim rolled from steel.

To further improve the appearance of the vehicle wheel, the wheel disc can be formed to include the outboard tire bead retaining flange. The resulting wheel disc, which is called a full face wheel disc, is attached to the outboard end of a partial wheel rim. The attachment can occur at the outboard tire bead seat, the deepwell, or another location. The assembled vehicle wheel is often referred to as a full face wheel. When a tire is mounted on a full face wheel, the joint between the wheel disc and the wheel rim is completely hidden and only the wheel disc is visible. A decorative finish is often applied to the face of the wheel disc to further enhance the appearance of the wheel.

SUMMARY OF THE INVENTION

The partial wheel rim and the full face wheel disc are typically attached to one another by use of a butt joint between the outboard end of the wheel rim and an inboard portion of the wheel disc. The wheel rim and the wheel disc are joined and welded together to form the full face wheel. The use of a butt joint requires additional tooling for fixturing and assembly of the wheel rim and the wheel disc, which increases the cost of manufacturing the full face wheel. Another design for a full face wheel uses an interference fit between the inner diameter of the outboard end of the wheel rim and the outer diameter of an annular inboard shoulder of the wheel disc. Such a design also requires additional tooling for fixturing and assembly of the wheel rim and the wheel disc.

The present invention relates to a full face wheel comprising a full face wheel disc and a partial wheel rim. The wheel disc includes an inboard portion having an annular groove formed therein. The wheel rim includes an annular tapered outboard end. The tapered outboard end of the wheel rim is received in the groove in a slip fit. A bond such as a weld is formed between the outboard end of the wheel rim and the inboard portion of the wheel disc to secure the wheel rim to the wheel disc.

The invention also contemplates a process for fabricating a full face wheel. Initially, a full face wheel disc and a partial wheel rim are formed. The wheel disc is formed with an inboard portion having an annular groove formed therein. The wheel rim is formed with an annular tapered outboard end. The wheel rim is assembled onto the wheel disc by inserting the tapered outboard end of the wheel rim into the groove in the wheel disc in a slip fit. Lastly, the outboard end of the wheel rim is secured to the inboard portion of the wheel disc to form the full face wheel.

The joint design of the present invention allows the wheel rim to be simply inserted into the wheel disc without the use of fixturing or heat used to currently expand the rim. The design also provides the opportunity to manually assemble the rim to the disc, thus eliminating expensive tooling. Dimensional improvements are seen in both radial machining and lateral machining of the inboard bead seat since the two components simply slide together with the force applied in the weld station.

DETAILED DESCRIPTION OF THE PREFERRED EMBODIMENT

Figure 1:
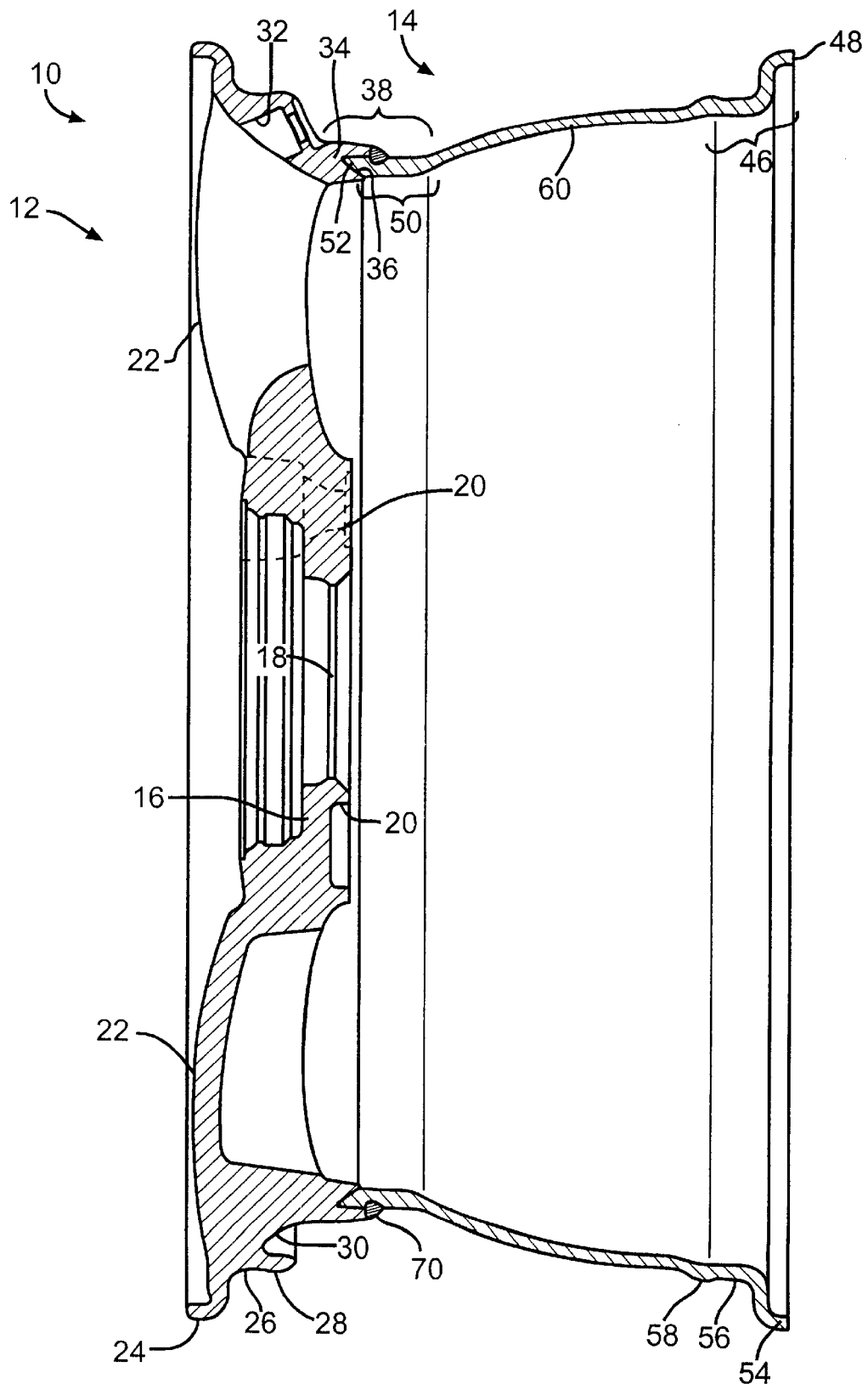
FIG. 1 is a sectional view of a full face vehicle wheel according to the present invention.
Figure 2:
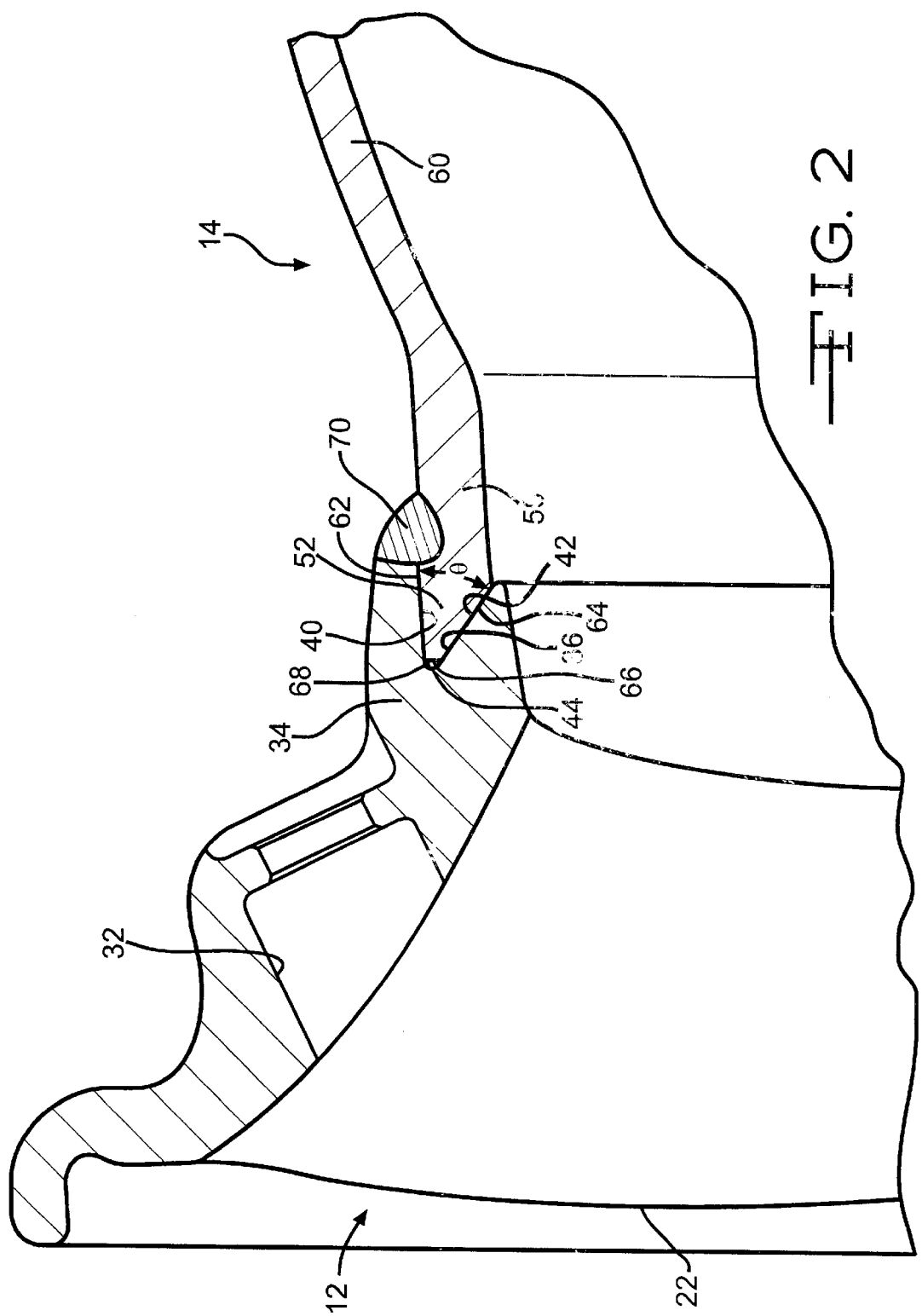
FIG. 2 is an enlarged sectional view of the joint between the partial wheel rim and the full face wheel disc of the full face wheel shown in FIG. 1.

Referring now to FIGS. 1 and 2, a full face vehicle wheel according to the present invention is illustrated and generally designated by the reference numeral 10. The vehicle wheel 10 comprises an axially outboard full face wheel disc 12 attached to an axially inboard partial wheel rim 14. The wheel disc 12 includes a centrally disposed wheel hub 16 having a pilot hole 18 and a plurality of wheel lug holes 20 formed therethrough. A plurality of spokes 22 extend radially outwardly from the wheel hub 16. On its perimeter portion, the wheel disc includes an outboard tire bead retaining flange 24, an outboard tire bead seat 26 and an outboard safety hump 28. A lightener channel 30 extends around the wheel disc 12 radially inwardly from the bead seat 26 and safety hump 28. A valve stem hole 32 is formed through the perimeter of the wheel disc 12.

The wheel disc 12 further includes an inboard portion 34 having an annular groove 36 formed therein. The inboard portion 34 of the wheel disc 12 can be any portion facing in the inboard direction and adapted for having the groove 36 formed therein. In the illustrated embodiment, the inboard portion 34 is a generally cylindrical portion which forms an outboard portion of the deepwell 38 of the vehicle wheel 10. As best shown in FIG. 2, the groove 36 has a tapered shape, defined by a first, outer groove surface 40 and a second, inner groove surface 42. In the illustrated embodiment, the outer groove surface 40 is oriented generally in the axial direction. The groove 36 has an inner end 44.

The wheel disc 12 may be readily cast by a conventional process, such as gravity or low pressure casting, in a mold which is relatively simple compared to the complex mold required to produce a single piece cast wheel. Alternatively, the wheel disc 12 may be forged. In a preferred embodiment, the wheel disc 12 is made of an alloy of aluminum, magnesium, titanium or a similar lightweight, high strength metal.

As shown in FIG. 1, the partial wheel rim 14 has an inboard portion 46 including an inboard end 48 (at the right in the figure), and an outboard portion 50 including an outboard end 52 (at the left in the figure). The inboard portion 46 of the wheel rim 14 includes an inboard tire bead retaining flange 54, an inboard tire bead seat 56, and an inboard safety hump 58. A leg portion 60 extends between the inboard portion 46 and the outboard portion 50 of the wheel rim 14. The outboard portion 50 of the wheel rim 14 forms an inboard portion of the deepwell 38 of the vehicle wheel 10. In the illustrated embodiment, the outboard portion 50 of the wheel rim 14 is thicker than the adjacent leg portion 60.

As best shown in FIG. 2, the outboard end 52 of the partial wheel rim 14 has a tapered shape which is defined by a first, outer rim surface 62 and a second, inner rim surface 64. In the illustrated embodiment, the tapered shape of the outboard end 52 of the wheel rim 14 is complementary with the shape of the groove 36. Preferably, the outer rim surface 62 and the inner rim surface 64 are oriented at an angle θ between about 40° and about 70° relative to one another, and more preferably between about 45° and about 60°. In the embodiment shown, the outer rim surface 62 is oriented generally in the axial direction. Preferably, the outboard end 52 of the wheel rim 14 has a flattened tip 66 such that a space 68 is defined between the tip 66 and the inner end 44 of the groove 36, for a purpose to be described below.

The wheel rim 14 may be fabricated by butt welding together the ends of a strip of metal formed into a cylindrical hoop, and then forming the hoop by conventional rolling or spinning operations into the shape illustrated in FIG. 1. The wheel rim 14 material is preferably an alloy of aluminum but may also be an alloy of magnesium, titanium or a similar lightweight, high strength metal. Alternatively, the wheel rim 14 can be formed from steel.

Figure 3:
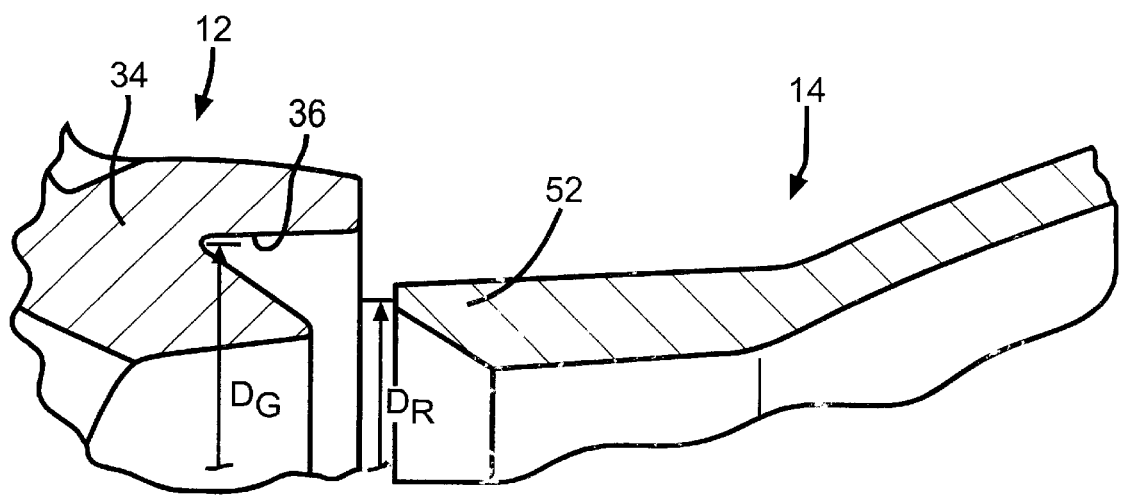
FIG. 3 is an enlarged sectional view of the inboard portion of the wheel disc and the outboard end of the wheel rim just prior to assembling the wheel rim onto the wheel disc.
Figure 4:
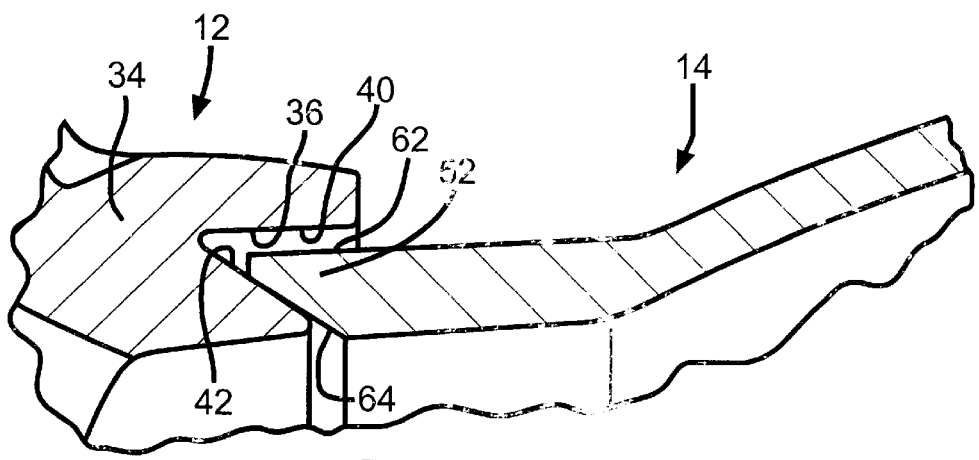
FIG. 4 is an enlarged sectional view showing the tapered outboard end of the wheel rim being inserted into the groove in the inboard portion of the wheel disc.
Figure 5:
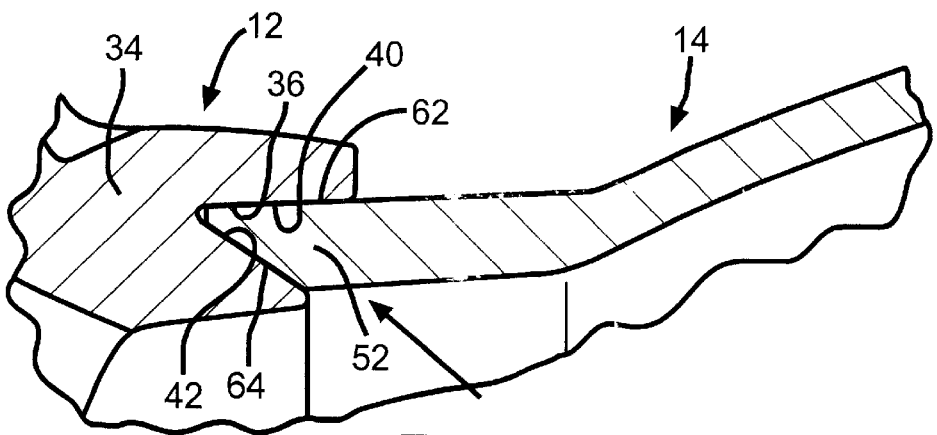
FIG. 5 is an enlarged sectional view of the wheel rim assembled onto the wheel disc, with the tapered outboard end of the wheel rim fully inserted into the groove in the inboard portion of the wheel disc.

FIGS. 3–5 illustrate the assembly of the partial wheel rim 14 onto the full face wheel disc 12 to make the full face vehicle wheel 10. As shown in FIG. 3, prior to assembly of the wheel rim 14 onto the wheel disc 12, the outboard end 52 of the wheel rim 14 has a diameter $D_R$ which is different from the diameter $D_G$ of the groove 36. In the illustrated embodiment, the diameter $D_R$ of the wheel rim 14 is smaller than the diameter $D_G$ of the groove 36. Of course, the diameter $D_R$ of the wheel rim 14 could also be larger than the diameter $D_G$ of the groove 36.

As shown in FIG. 4, the wheel rim 14 is assembled onto the wheel disc 12 by inserting the tapered outboard end 52 of the wheel rim 14 into the groove 36 in the inboard portion 34 of the wheel disc 12. Because the diameter $D_R$ of the wheel rim 14 is smaller than the diameter $D_G$ of the groove 36, the inner rim surface 64 initially contacts the inner groove surface 42 while the outer rim surface 62 is spaced from the outer groove surface 40.

As shown in FIG. 5, the assembly is completed by forcing the tapered outboard end 52 of the wheel rim 14 into the groove 36 in the wheel disc 12. The inner rim surface 64 slides along the inner groove surface 42 so that the outboard end 52 of the wheel rim 14 moves both laterally and radially when it is forced into the groove 36, in the direction shown by the arrow. The material of the wheel rim 14 allows the outboard end 52 to expand radially outwardly as it is forced into the groove 36. The force required to insert the outboard end 52 of the wheel rim 14 into the groove 36 is sufficiently high such that the wheel rim 14 is mechanically pressed onto the wheel disc 12. The outboard end 52 of the wheel rim 14 is inserted into the groove 36 until the outer rim surface 62 engages the outer groove surface 40. In this manner, the outboard end 52 of the wheel rim 14 is inserted into the groove 36 in a slip fit.

After the wheel rim 14 is assembled onto the wheel disc 12, the outboard end 52 of the wheel rim 14 is secured to the inboard portion 34 of the wheel disc 12 to form the full face vehicle wheel 10. The wheel rim 14 can be secured to the wheel disc 12 by any suitable means, such as by a weld 70 formed between the outboard end 52 of the wheel rim 14 and the inboard portion 34 of the wheel disc 12. The weld 70 can be an outside diameter weld as shown in FIGS. 1 and 2, or it can be an inside diameter weld. The weld 70 can be a continuous weld around the entire circumference of the joint between the wheel rim 14 and the wheel disc 12, or it can comprise a plurality of spot welds around the circumference.

In a preferred embodiment, the outboard end 52 of the wheel rim 14 is secured to the inboard portion 34 of the wheel disc 12 by use of an adhesive (not shown). The adhesive can be used alone or in addition to a weld 70. If an adhesive is used, spot welds can be used instead of a continuous weld, resulting in faster weld times. In the embodiment shown, the adhesive is applied in the space 68 between the flattened tip 66 of the outboard end 52 of the wheel rim 14 and the inner end 44 of the groove 36. The adhesive can also be applied between the outer rim surface 62 and the outer groove surface 40, and between the inner rim surface 64 and the inner groove surface 42. Any suitable adhesive can be used, such as, for example, Scotch Weld™ Duo-Pak Adhesive, e.g., DP-420 or DP-805, manufactured by 3M.

Figure 6:
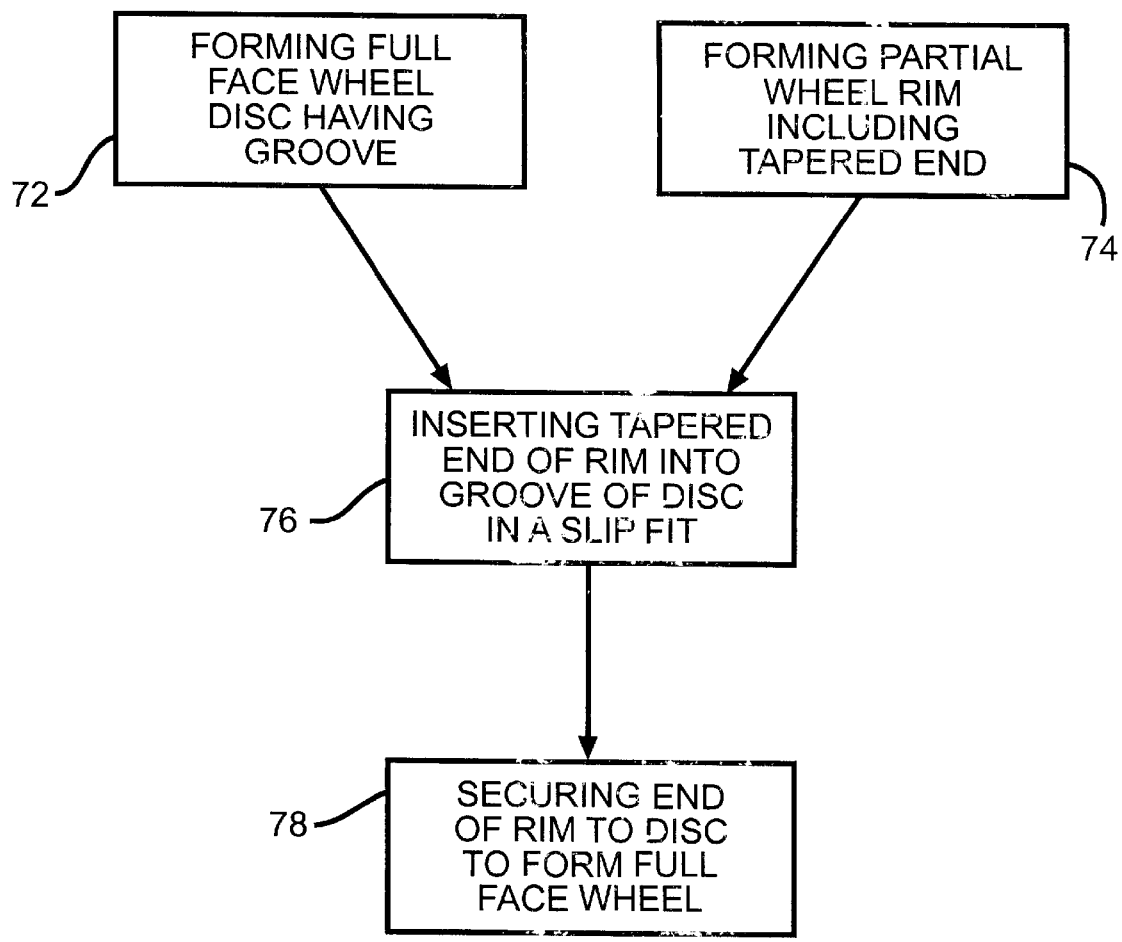
FIG. 6 is a flow chart of a process for fabricating a full face vehicle wheel in accordance with the invention.

The invention further contemplates a process for fabricating the full face vehicle wheel 10 shown in FIGS. 1 through 5. The process is illustrated by the flow chart shown in FIG. 6. In functional block 72, a full face wheel disc 12 is formed by a conventional method such as casting or forging. The wheel disc 12 includes an inboard portion 34 having an annular groove 36 formed therein. The groove 36 can be formed during the casting or forging operation, or it can be formed in a separate operation such as a machining operation. Concurrently, in functional block 74, a partial wheel rim 14 is formed by a conventional method such as rolling or spinning. The wheel rim 14 includes an annular tapered outboard end 52. The tapered outboard end 52 can be formed during the rolling or spinning operation, or it can be formed in a separate operation such as a machining operation. In functional block 76, the wheel rim 14 is assembled onto the wheel disc 12 by inserting the tapered outboard end 52 of the wheel rim 14 into the groove 36 in the wheel disc 12 in a slip fit. Finally, in functional block 78, the outboard end 52 of the wheel rim 14 is secured to the inboard portion 34 of the wheel disc 12 to form the full face vehicle wheel 10.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the invention is illustrated in relation to a full face vehicle wheel 10 having a particular structure, it should be recognized that the invention also applies to different structures of vehicle wheels.

What is claimed is:

1. A full face wheel comprising:
   a full face wheel disc including an inboard portion having an annular groove formed therein, the annular groove having a diameter; and
   a partial wheel rim including an annular tapered outboard end which is complementary with the groove formed in the wheel disc, the wheel rim end having a diameter which is different from the diameter of the wheel disc groove, the wheel rim outboard end being pressed into the groove with the difference between the diameter of the wheel disc groove and the diameter of the end of the wheel rim causing the outboard end of the wheel rim to be displaced in both an axial direction and in a radial direction to secure the wheel rim upon the wheel disc.

2. The full face wheel defined in claim 1 wherein the tapered outboard end of the wheel rim is defined by a first rim surface and a second rim surface which are oriented at an angle between about 40° and 70° to one another.

3. The full face wheel defined in claim 2 wherein the first and second rim surfaces are oriented at an angle between about 45° and about 60° relative to one another.

4. The full face wheel defined in claim 1 wherein, prior to assembly, the outboard end of the wheel rim has a diameter which is less than the diameter of the wheel disc groove.

5. The full face wheel defined in claim 1 wherein the wheel rim is mechanically assembled with the wheel disc.

6. The full face wheel defined in claim 1 wherein the tapered outboard end of the wheel rim has a flattened tip such that a space is defined between the tip and an inner end of the groove.

7. The full face wheel defined in claim 1 wherein the tapered outboard end of the wheel rim is defined by a first rim surface and a second rim surface and further wherein the first rim surface extends generally axially.

8. The full face wheel defined in claim 7 wherein the first rim surface is a radially outer rim surface and the second rim surface is a radially inner rim surface.

9. The full face wheel defined in claim 1 wherein the partial wheel rim includes an outboard portion formed as a deepwell and a center portion formed as a wheel rim leg portion and further wherein the deepwell portion is thicker than the leg portion of the partial wheel rim.

10. A process for fabricating a full face wheel comprising the following steps:
    (a) forming a full face wheel disc which includes an inboard portion having an annular groove formed therein, the annular groove having a diameter;
    (b) forming a partial wheel rim which includes an annular tapered outboard end which is complementary with the groove formed in the wheel disc, the wheel rim end having a diameter which is different from the diameter of the wheel disc groove;
    (c) assembling the wheel rim onto the wheel disc by pressing the tapered outboard end of the wheel rim into the groove in the wheel disc with the difference between the diameter of the wheel disc groove and the diameter of the end of the wheel rim causing the outboard end of the wheel rim to move in both an axial direction and in a radial direction to secure the wheel rim upon the wheel disc.

11. The process defined in claim 10 wherein the tapered outboard end of the wheel rim is formed having a first rim surface and a second rim surface which are oriented at an angle between about 40° and about 70° relative to one another.

12. The process defined in claim 10 wherein, prior to assembling the wheel in step (c), the diameter of the outboard end of the wheel rim is less than the diameter of the wheel disc groove.

13. The process defined in claim 10 wherein the wheel rim is mechanically assembled onto the wheel disc.

\* \* \* \* \*